Oct. 29, 1929.  P. R. G. BIEDERMANN  1,733,180
VALVE
Original Filed March 14, 1927
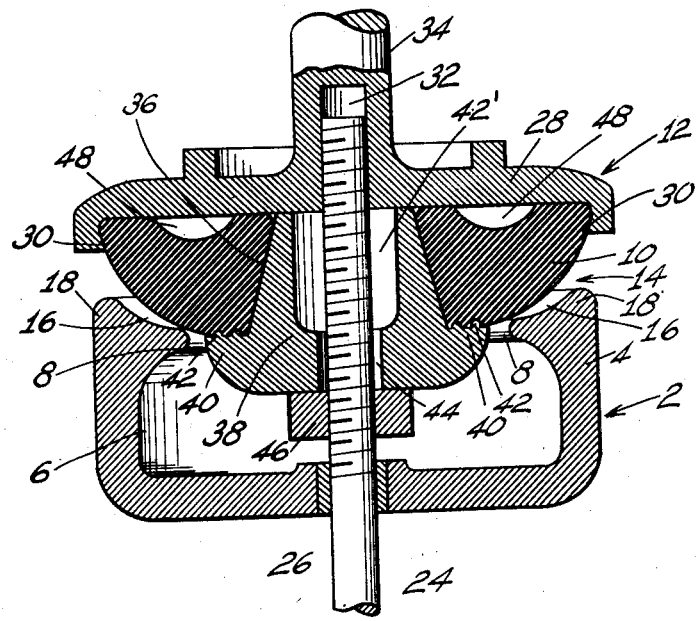
FIG. 1
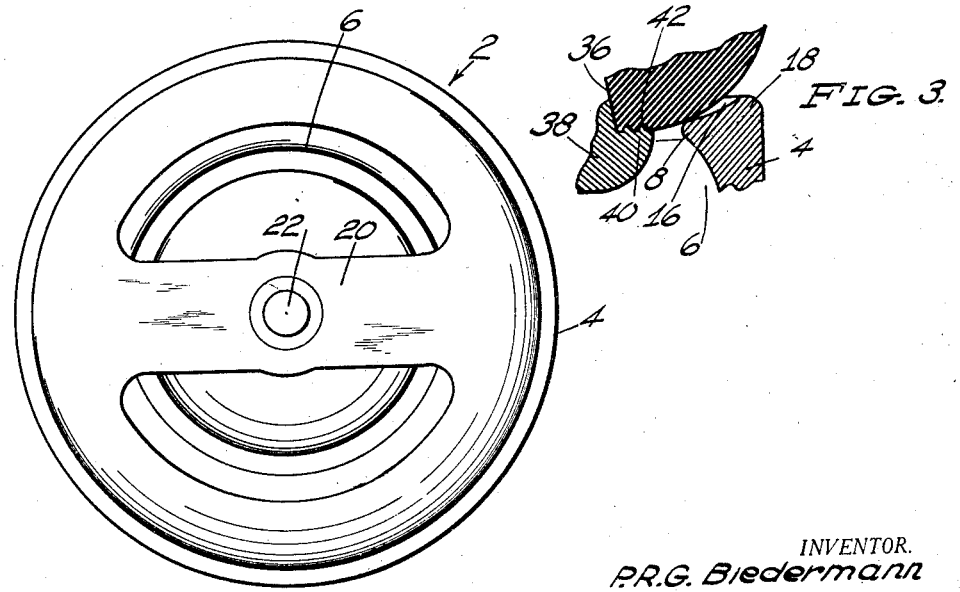
FIG. 2.
FIG. 3.
INVENTOR.
P.R.G. Biedermann
BY
ATTORNEY.

Patented Oct. 29, 1929

1,733,180

UNITED STATES PATENT OFFICE

PAUL R. G. BIEDERMANN, OF LOS ANGELES, CALIFORNIA

VALVE

Application filed March 14, 1927, Serial No. 175,158. Renewed March 25, 1929.

My invention relates to valves and seats therefor, adapted for special use in connection with slush pumps used in oil well practice, said invention being especially devised for use in deep drilling.

In practice it has been found that in deep drilling where a valve provided with a resilient insert is used, that under pressures exceeding 500 pounds per square inch there is a tendency to force said insert from the cap of the valve. By the use of my invention this defect, as repeatedly demonstrated in practice, is effectively overcome, said valves in actual operation having successfully withstood pressures exceeding 1200 pounds per square inch without the insert being blown out.

It accordingly is an object of my invention to provide a novel form of valve comprising an internally tapered cap in which is clamped, by means of a frusto-conical sleeve or washer, a hollowed-out internally tapered annular insert, preferably formed of resilient material, the bottom of which is covered substantially in the shape of a quarter of a circle.

It is also within the province of my invention to provide a novel form of valve seat, preferably of cylindrical form and equipped with a tapered cut-away portion defining a curved ledge for checking the velocity of the fluid as it enters said inlet, so that said fluid will be directed to and impinge on the cap of the valve with which said seat is adapted to be associated, the top portion of said seat being provided with concaved and convex portions, said seat being thereby absolutely non-scoring.

The above and further objects and advantages of my invention, as will hereinafter more fully appear, I attain by the device constructed in accordance with the description and drawings forming a part of this application.

Reference is had to the accompanying drawings in which similar reference characters denote similar parts. In the drawings, Fig. 1 is a fragmentary vertical sectional view through my improved valve and seat therefor, Fig. 2 is a somewhat enlarged bottom plan view of the valve seat, and Fig. 3 is a fragmentary cross-sectional detail of the valve and its seat illustrating the manner in which the insert begins to seat on the seat of the valve.

Describing my invention more in detail, considerable trouble has been found in practice, where valves with resilient or rubber composition inserts are used, in the insert being forced from the valve in deep drilling by reason of the excessive pressure to which said valves are subjected.

The seats of the known valves, also, are subjected to scoring by reason of sand, grit, pebbles or the like being swept over said seat. By the use of my invention scoring is impossible, the fluid, by reason of its being directed to the insert, effectively preventing the deleterious effect.

To this end, I provide a novel form of valve seat 2, comprising a preferably cylindrical member 4, cut-away as at 6, to provide a tapered fluid inlet, and also defining a ledge 8 adapted to check the velocity of the entering fluid, and also so as to direct said fluid to the insert 10 of the valve 12, hereinafter more particularly described, so that scoring of the seat of the valve is effectively prevented.

The seat 14 is provided with a concaved portion 16 and a convex portion 18, shaped as shown, to provide for an accurate seating of the valve 12, and to prevent the lodging of pebbles, grit, sand and the like, between the insert 10 and the seat 14. The bottom of the seat 14 is provided with a bridge portion 20, preferably shaped as shown, and equipped with a perforation 22 to receive the stem 24 of the valve, a bushing 26, if desired, being provided to prevent wear.

The valve 12 comprises a cap 28, tapered internally as at 30, for the reception of the top portion of the resilient insert 10, to assist in preventing the forcible removal of said insert from said cap when the valve is subjected to excessive pressures, as in deep drilling, said cap being also equipped with a threaded cavity 32 in the projection 34 for the reception of the valve stem 24.

As hereinbefore explained, the insert 10 is of annular form, and is internally tapered as at 36, for the reception of the clamping washer or sleeve 38, which is flanged as at 40, which flange is equipped with teats or projections 42 to prevent creeping of the insert 10. Preferably, the washer or sleeve 38 is hollowed out as at 42', and has a hole 44 for receiving the stem 24, the shape of said washer or sleeve being frusto-conical, a nut or other device 46 serving to tighten the sleeve or washer 38 so as to hold the insert 10 in the cap 12. The tapered portions 30 and 36 effectively prevent the forcible removal of the insert 10 from the cap 12 at all pressures to which the valve may be subjected.

The annular insert 10 is provided with a hollowed-out or cut-away portion 48, thereby, when said valve is assembled, forming an air cushion, functioning when said valve is seated to eject or dislodge any sand, grit pebbles or the like that may become lodged between the valve and its seat.

The tapered portions 30 and 36 are directly opposed, so that when the washer or sleeve 38 is drawn up by the nut or other device 46, there is a tendency to expand the insert, forcing it tightly into the tapered portion 30 of the cap 12, thus preventing any possibility of the insert 10 being blown out of said cap.

The face or bottom of the insert 10, as stated, is in the shape of a quarter circle, so that when said face or bottom comes in contact with the seat 14, under pressure, said seat or face conforms with the contour of said valve seat, thus forming a positively leak-proof joint.

While I have thus described my invention with great particularity, it will be clear that the same may be modified throughout a wide range. I accordingly do not propose to be limited to the exact details of construction described and illustrated, but reserve the right in practice to make any and all modifications thereof that fall within the scope of the appended claims.

I claim as my invention:

1. A valve construction comprising in combination, a valve seat, a valve stem adapted to be moved relatively to said seat, a valve cap associated with said stem, said cap being provided internally with a tapered portion, a plano-convex annular internally tapered resilient insert positioned in said cap, said insert having its plane portion hollowed-out, an externally tapered sleeve mounted on said stem, and means on said stem for clamping said sleeve to said cap.

2. A valve construction comprising in combination, a valve seat, a valve adapted to be moved relatively to said seat, said valve comprising a cap, an insert in said cap, said insert having an upper plane portion, cut away to provide an air cushion, closed by said cap, and clamping means for clamping said insert to said cap, said cap and said clamping means having reversely positioned tapered portions for preventing the forcible removal of said insert from said cap.

3. In a valve, a seat therefor, a stem for said valve adapted to move relatively with said seat, a cap adjustable on said stem, said cap having an inwardly tapered flange, a plano-convex annular insert in said cap, said insert having its upper curved portion in engagement with said tapered flange, said insert being internally tapered from its convex portion to its plane portion, and an externally tapered flanged frusto-conical clamping member adapted to have its tapered portion engage the tapered portion of said insert, and its flange engage the convex portion of said insert.

4. An insert adapted for special use in connection with a valve, said insert comprising an annular plano-convex member, tapered internally from its convex portion to its plane portion, said plane portion being hollowed out, and its convex portion being curved substantially in the arc of a quarter circle.

5. In a valve, in combination, an insert in said valve, said insert comprising an annular plano-convex member, tapered internally from its convex portion to its plane portion, said plane portion being hollowed-out, and its convex portion being curved substantially in the arc of a quarter circle, a base, said base being cut away to provide a tapered fluid inlet, and a ledge concaved at its top and bottom, and its edge convex, said ledge being adapted to obstruct the velocity of the fluid as it enters said inlet and guide said fluid, the top concaved portion of said seat being of substantially greater length than the bottom concaved portion of said ledge, whereby scoring of said seat may effectively be prevented.

6. In a valve construction, in combination, an insert in said valve, said insert comprising an annular plano-convex member, tapered internally from its convex portion to its plane portion, said plane portion being hollowed-out, and its convex portion being curved substantially in the arc of a quarter circle, a seat, said seat comprising a cylindrical member provided with a tapered fluid inlet, a ledge extending internally from said member, said ledge being concaved at its top and bottom and convex at its edge, a cap associated with said seat, the top concaved portion of said ledge being substantially longer than said bottom concaved portion, which top portion, when said valve is closed, being adapted to coact with said seat to form a fluid seal along the entire length of said concaved portion.

In testimony whereof I have signed my name to this specification.

PAUL R. G. BIEDERMANN.